US012794859B2

(12) United States Patent
Du Toit et al.

(10) Patent No.: US 12,794,859 B2
(45) Date of Patent: Nov. 10, 2026

(54) APPARATUS FOR SECURE NETWORK COMMUNICATIONS

(71) Applicant: CA, Inc., Palo Alto, CA (US)

(72) Inventors: Roelof Du Toit, Portersville, PA (US); Gary Tomic, Petersburg (CA); James Taft, Downers Grove, IL (US)

(73) Assignee: CA, Inc., Palo Alto, CA (US)

( * ) Notice: Subject to any disclaimer, the term of this patent is extended or adjusted under 35 U.S.C. 154(b) by 58 days.

(21) Appl. No.: 18/944,252

(22) Filed: Nov. 12, 2024

(65) Prior Publication Data

US 2025/0240278 A1 Jul. 24, 2025

Related U.S. Application Data

(60) Provisional application No. 63/623,072, filed on Jan. 19, 2024.

(51) Int. Cl.

| | |
|---|---|
| ***H04L 29/00*** | (2006.01) |
| ***H04L 9/40*** | (2022.01) |

(52) U.S. Cl.

CPC ...... *H04L 63/0414* (2013.01); *H04L 63/0281* (2013.01)

(58) Field of Classification Search

CPC ............. H04L 63/0414; H04L 63/0281; H04L 63/0272; H04L 63/166

See application file for complete search history.

(56) References Cited

U.S. PATENT DOCUMENTS

| | | | | |
|---|---|---|---|---|
| 5,537,642 | A * | 7/1996 | Glowny | H04L 67/148 714/E11.097 |
| 6,888,836 | B1 * | 5/2005 | Cherkasova | H04L 67/1038 370/400 |
| 8,225,085 | B2 * | 7/2012 | Karandikar | H04L 63/166 713/153 |
| 10,992,579 | B2 * | 4/2021 | Chand | H04L 12/4633 |
| 11,171,875 | B2 * | 11/2021 | Osterlund | H04L 45/28 |
| 11,228,519 | B1 * | 1/2022 | Devarajan | H04L 43/0864 |

(Continued)

FOREIGN PATENT DOCUMENTS

| | | | | |
|---|---|---|---|---|
| CA | 2467988 C | * | 11/2010 | H04L 63/166 |
| CN | 117527287 A | | 2/2024 | |
| CN | 117834253 A | * | 4/2024 | H04L 67/141 |

OTHER PUBLICATIONS

RFC9937, RFC Editor United States, DOI: https://doi.org/10.17487/RFC9937, Published: Dec. 2022 (Year: 2022).*

*Primary Examiner* — Don G Zhao

(74) *Attorney, Agent, or Firm* — Quarles & Brady LLP

(57) ABSTRACT

An embodiment of the present invention describes means by which a proxy can maintain visibility between a client and a server when the client initiates a Transport Layer Security connection with Encrypted Client Hello (ECH). The proxy uses intelligence data has the ability to identify connections between clients and servers that are utilizing the Encrypted Client Hello extension to Transport Layer Security (TLS) Protocol Version 1.3 and triggers the client to fallback to utilizing a new connection that does not utilize ECH. This preserves the proxy's ability to determine the true destination of the client and identify the risks and characteristics of the request and response and act based on the administrator's authored policy.

15 Claims, 4 Drawing Sheets

(56) References Cited

U.S. PATENT DOCUMENTS

| | | | | |
|---|---|---|---|---|
| 11,336,692 | B1 * | 5/2022 | McCorkendale | H04L 63/1441 |
| 11,552,925 | B1 * | 1/2023 | Craciun | H04L 63/0428 |
| 11,689,642 | B2 * | 6/2023 | Parla | H04L 45/645 370/392 |
| 11,784,904 | B2 * | 10/2023 | Kamath | H04L 67/148 709/224 |
| 11,838,262 | B1 * | 12/2023 | Kangas | H04L 61/09 |
| 11,943,258 | B2 * | 3/2024 | Wright | H04L 63/0823 |
| 12,052,329 | B2 * | 7/2024 | Parla | H04L 67/1004 |
| 12,095,665 | B2 * | 9/2024 | Mestery | H04L 45/74 |
| 12,107,890 | B2 * | 10/2024 | Savin | H04L 63/0442 |
| 12,413,650 | B2 * | 9/2025 | Parla | H04L 63/0281 |
| 12,452,214 | B2 * | 10/2025 | Kasslin | H04L 63/0272 |
| 2008/0307219 | A1 * | 12/2008 | Karandikar | H04L 63/166 713/153 |
| 2013/0086239 | A1 * | 4/2013 | Siegel | H04L 61/5014 709/223 |
| 2016/0359872 | A1 * | 12/2016 | Yadav | H04L 63/1408 |
| 2016/0381052 | A1 * | 12/2016 | Yagi | H04L 12/6418 707/769 |
| 2017/0272625 | A1 * | 9/2017 | Gravis | G08B 13/19619 |
| 2019/0028439 | A1 * | 1/2019 | Moore | H04L 63/0281 |
| 2020/0220863 | A1 * | 7/2020 | Athlur | H04L 9/3226 |
| 2020/0267190 | A1 * | 8/2020 | Dröse | H04L 43/0858 |
| 2021/0021518 | A1 * | 1/2021 | Chand | H04L 45/021 |
| 2021/0112060 | A1 * | 4/2021 | Billawala | H04L 63/101 |
| 2021/0218714 | A1 * | 7/2021 | Wang | H04L 63/0428 |
| 2021/0258350 | A1 * | 8/2021 | Buck | H04L 63/0272 |
| 2022/0224620 | A1 * | 7/2022 | Chhabra | H04L 12/4633 |
| 2022/0224622 | A1 * | 7/2022 | Kamath | H04L 69/162 |
| 2022/0224623 | A1 * | 7/2022 | Kamath | H04L 12/4641 |
| 2022/0224703 | A1 * | 7/2022 | Devarajan | H04L 45/20 |
| 2022/0239960 | A1 * | 7/2022 | Harrison | H04N 21/26258 |
| 2022/0247657 | A1 * | 8/2022 | Kamath | H04L 67/148 |
| 2022/0368725 | A1 * | 11/2022 | Wright | H04L 9/3263 |
| 2022/0377602 | A1 * | 11/2022 | Kim | H04W 28/06 |
| 2023/0015687 | A1 * | 1/2023 | Parla | H04L 47/2483 |
| 2023/0164119 | A1 * | 5/2023 | Kasslin | H04L 63/0272 726/12 |
| 2023/0224248 | A1 * | 7/2023 | Mestery | H04L 69/165 370/389 |
| 2023/0291813 | A1 * | 9/2023 | Parla | H04L 45/645 |
| 2023/0328102 | A1 * | 10/2023 | Savin | H04L 63/0414 726/4 |
| 2024/0048590 | A1 * | 2/2024 | Du Toit | H04L 63/0442 |
| 2024/0137391 | A1 * | 4/2024 | Buck | H04L 61/4511 |
| 2024/0314219 | A1 * | 9/2024 | Parla | H04L 67/56 |
| 2024/0414200 | A1 * | 12/2024 | Savin | H04L 61/4511 |
| 2025/0028940 | A1 * | 1/2025 | Nagy | G06N 20/00 |
| 2025/0097200 | A1 * | 3/2025 | Xiao | H04L 63/0236 |
| 2025/0202912 | A1 * | 6/2025 | Savin | H04L 63/1416 |
| 2025/0220044 | A1 * | 7/2025 | Jenkins | H04L 63/166 |

* cited by examiner

FIG. 1 – System 100
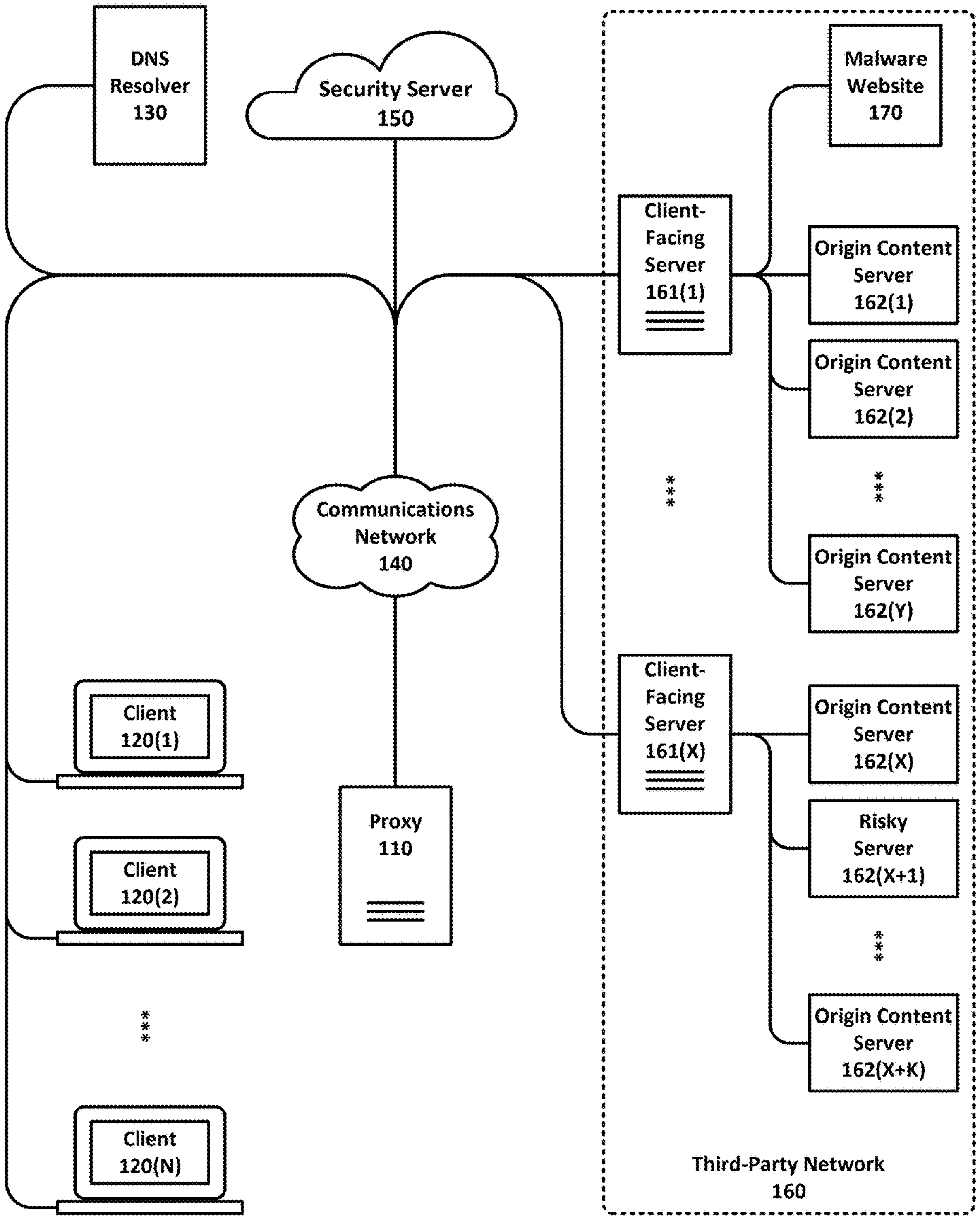

FIG. 2 – Proxy 110
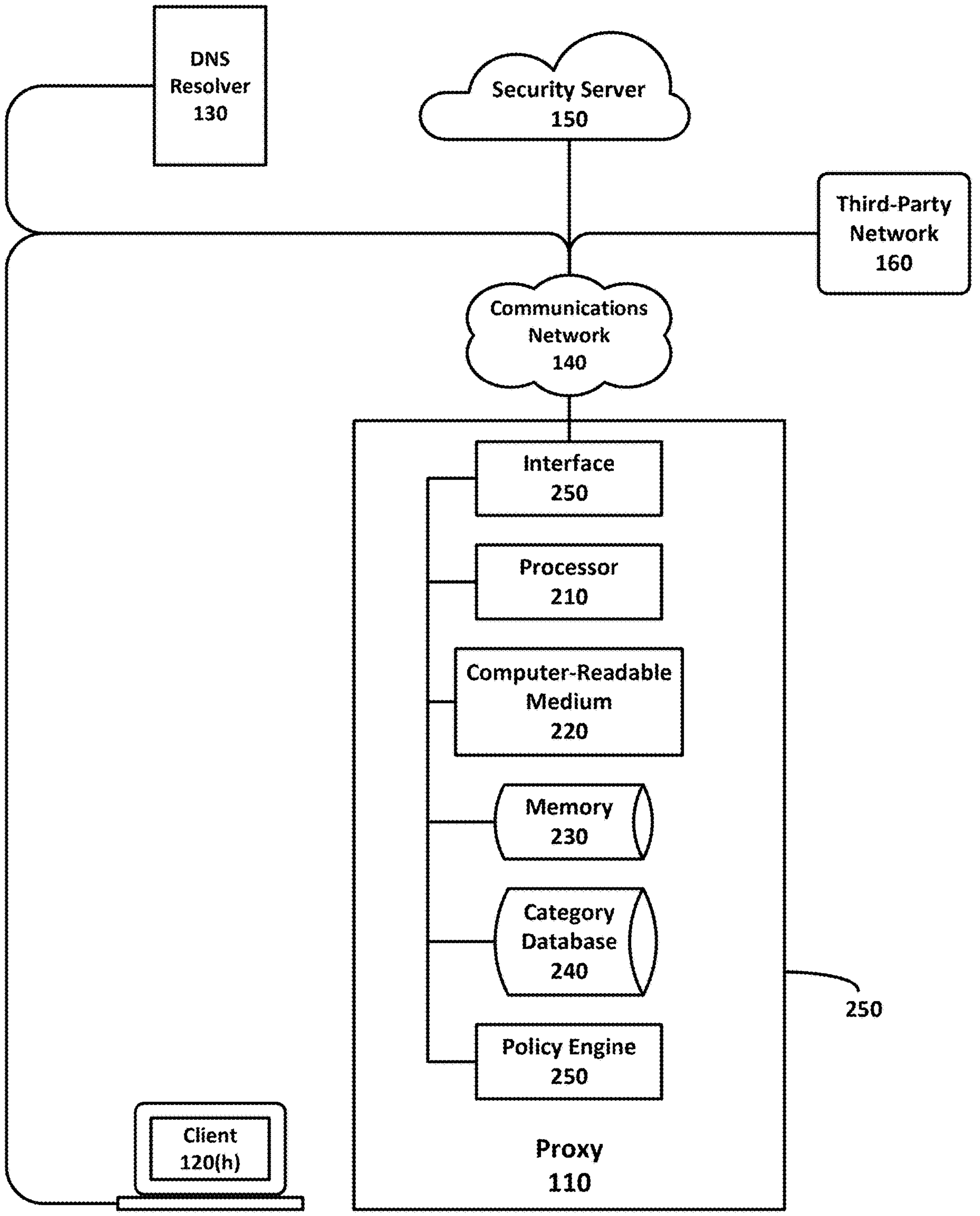

FIG. 3 – Proxy Operation
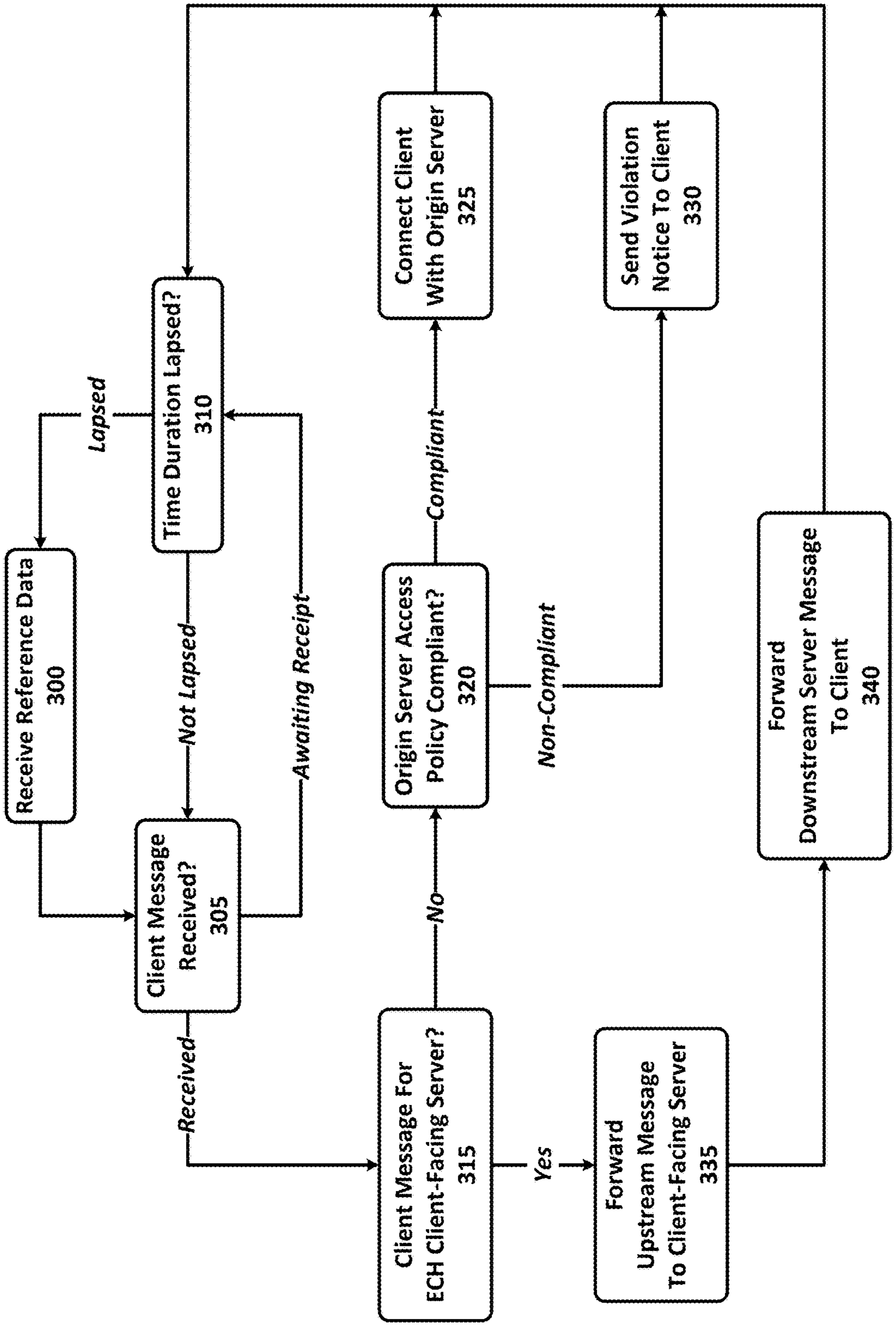

FIG. 4 – Event Trace Diagram
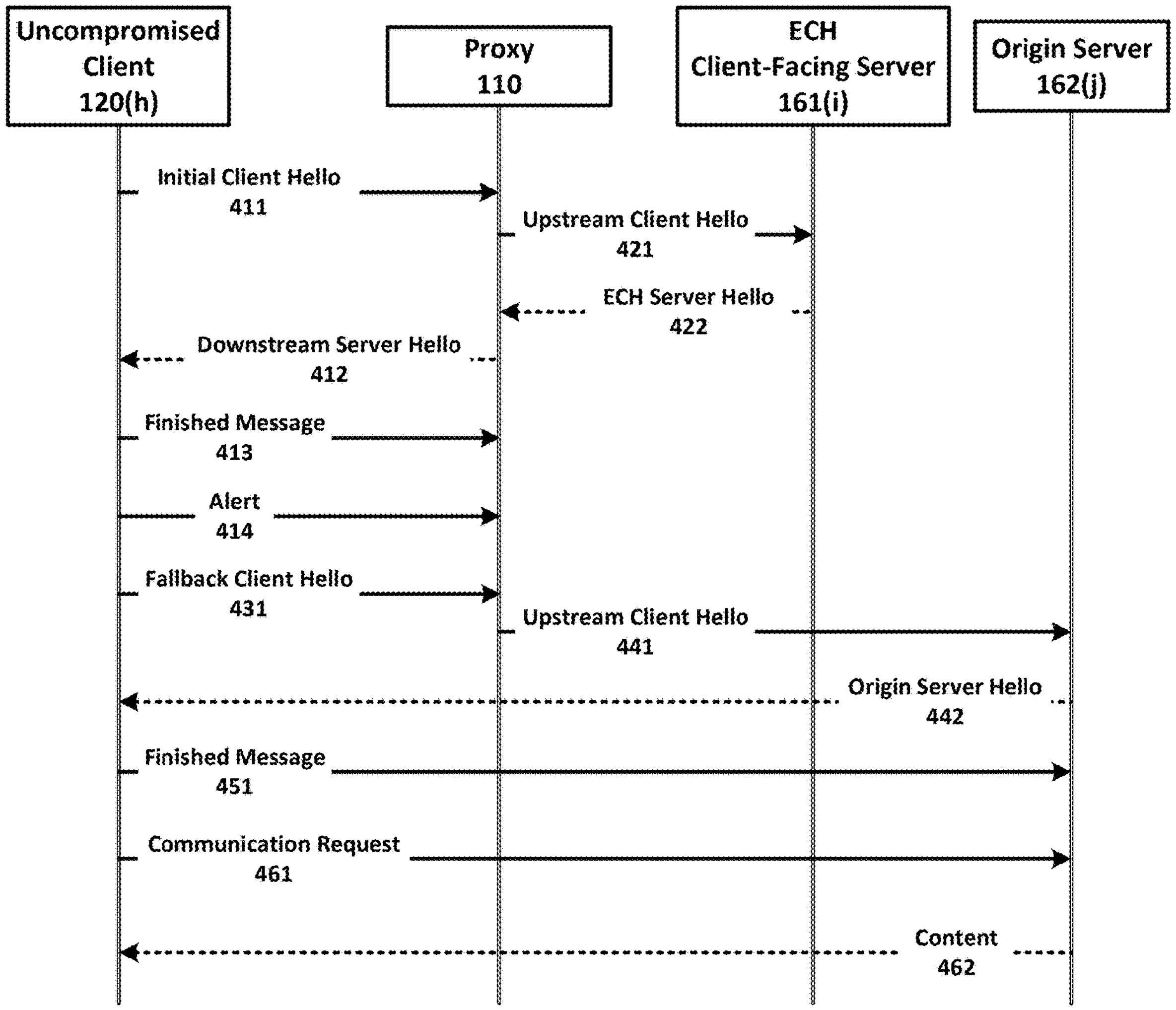
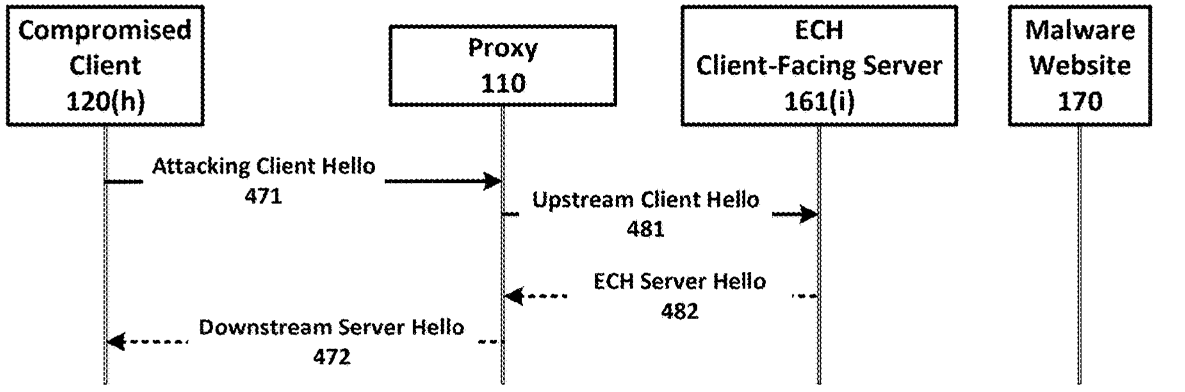

APPARATUS FOR SECURE NETWORK COMMUNICATIONS

CLAIM OF BENEFIT TO PRIOR APPLICATION

The present application claims the benefit of U.S. Provisional Patent Application 63/623,072, filed Jan. 19, 2024. This patent application is incorporated herein by reference in its entirety for all purposes.

BACKGROUND

The Encrypted Client Hello (ECH) TLS extension has the ability to hide the true hostname of the destination host. While this introduces additional privacy capability between the host and the server, it also cloaks malicious destinations allowing attackers to establish communication much more easily between clients and servers. Many enterprises deploy proxies to prevent their endpoints from communicating with risky and malicious destinations and ECH prevents the proxies from identifying these nefarious destinations. This patent describes the means by which a proxy can maintain visibility between the client and the server when the client initiates a TLS connection with ECH.

BRIEF DESCRIPTION OF DRAWINGS

The accompanying drawings, which are incorporated in and form a part of this specification, illustrate examples of the disclosure and, together with the description, explain principles of the examples.

FIG. 1 illustrates a functional block diagram of an exemplary system, in accordance with one or more embodiments of the disclosure.

FIG. 2 illustrates a functional block diagram of an exemplary gateway, in accordance with one or more embodiments of the disclosure.

FIG. 3 illustrates a flowchart for an exemplary proxy operation, in accordance with one or more embodiments of the disclosure.

FIG. 4 illustrates an exemplary event trace diagram, in accordance with one or more embodiments of the disclosure.

In the drawings, like reference symbols and numerals indicate the same or similar components. Like elements in the various figures are denoted by like reference symbols and numerals for consistency. Unless otherwise indicated, like elements and method steps are referred to with like reference numerals.

DETAILED DESCRIPTION OF THE INVENTION

The following describes technical solutions in this specification with reference to the accompanying drawings. Exemplary embodiments are described in detail with reference to the accompanying drawings.

The terminology used herein is for describing various examples only, and is not to be used to limit the disclosure. Unless otherwise defined, all terms, including technical and scientific terms, used herein have the same meaning as commonly understood by one of ordinary skill in the art to which this disclosure pertains and after an understanding of the disclosure of this application.

Terms, such as those defined in commonly used dictionaries, are to be interpreted as having a meaning that is consistent with their meaning in the context of the relevant art and the disclosure of this application. Although the present technology has been described by referring to certain examples, workers skilled in the art will recognize that changes may be made in form and detail without departing from the scope of the discussion.

As a technical problem in the art, Internet servers can be used for malicious purposes to trick or infect clients that are accessing content on these servers. This can pose significant threats to the client and user. Attackers can exploit vulnerabilities, outdated software, or weak security configurations to gain unauthorized access to the client. This endangers the organization's data and reputation making robust security measures essential to mitigate these threats. Accordingly, there is a need in the art for an improved system to protect clients from this risk.

Referring to FIG. 1, an example of system 100 is illustrated. System 100 may include proxy 110, clients 120(1) through 120(N) with "N" being an integer number, Domain Name System (DNS) resolver 130, communications network 140, security server 150, and third-party network 160. Those skilled in the art will appreciate there may be additional components in system 100. Clients 120(1) through 120(N) may be collectively referred to as "clients 120(*h*)." Any one of the clients 120(1) through 120(N) may be individually referred to as "client 120(*h*)." For example, Malware Website may also constitute a malicious original content server.

Referring to FIG. 2, an example proxy 110 is illustrated. Referred to herein, a "proxy" may be an intermediary device or system that facilitates communication between a client and one or more servers by intercepting, relaying, and potentially modifying data exchanged between them. As an example, a proxy can perform various functions, including security enforcement, data caching, load balancing, traffic monitoring, or content filtering. It may operate as one of or a combination of physical server, virtual server, or container, and can support a wide range of network protocols, acting on behalf of the client to manage or enhance communication while concealing or altering direct interactions between the client and the destination server.

Proxy 110 is an apparatus that may include hardware. By way of illustration, proxy 110 may include processor 210, computer-readable medium 220, memory 230, and interface 250. In some examples, processor 210, computer-readable medium 220, memory 230, category database 240, and interface 250 may be components that are separate and distinct from one another. In other examples, processor 210, computer-readable medium 220, memory 230, and interface 250 may be integrated into a single unit and housed within an equipment enclosure 250. Those skilled in the art will appreciate there may be additional components in proxy 110. For example, proxy 110 may contain the routers, switches, and other hardware equipment required for processing electronic information and distributing the electronic information throughout the communications network 140. Proxy 110 may be one or a combination of a physical server, virtual server, or container. A physical server may be hardware that is sited in a building at a geographic location. A virtual server or container may be in the form of software that is running on a physical server in the communications network 140.

Processor 210 is electronic hardware implemented as any suitable processing circuitry. The processing circuitry may include, but not limited to at least one of a microcontroller, a microprocessor, a single processor, and a multiprocessor. Processor 210 may include at least one of an embedded controller (EC), a central processing unit (CPU), an accelerated processing unit (APU), an application specific integrated circuit (ASIC), field programmable gate arrays (FPGA), logic circuitry, a state machine, a programmable processor, or the like. Processor 210 may be implemented as electronic hardware that may include digital circuits, analog circuits, or a combination of both digital and analog circuits. Analog circuits may include analog components that are suitable to process analog gate signals. Digital circuits may include switches and gates that are suitable to process digital gate signals.

Computer-readable medium 220 may be implemented as electronic hardware. As electronic hardware, computer-readable medium 220 may be a non-transitory machine-readable storage medium. The non-transitory machine-readable storage medium may be a non-transitory processor readable or computer readable storage medium. Computer-readable medium 220 may be any electronic device that retains executable instructions and/or data, a magnetic device, an optical device that retains executable instructions and/or data, and/or other physical storage device that retains executable instructions and/or data. For example, computer-readable medium 220 may comprise read-only memory ("ROM"), random access memory ("RAM"), other non-transitory computer-readable media and/or a combination thereof. In such examples, computer-readable medium 220 is both tangible and non-transitory.

The executable instructions may be in the form of software and/or firmware. The software and/or firmware may include program code. The program code may include program instructions that are readable and executable by processor 210, also referred to as machine-readable instructions.

Memory 230 may comprise read-only memory ("ROM"), random access memory ("RAM"), any other data storage media, and/or a combination thereof. Memory 230 may retain data, filters, rules and/or a combination thereof.

Category database 240 may comprise read-only memory ("ROM"), random access memory ("RAM"), any other data storage media, and/or a combination thereof. Category database 240 may retain data, filters, rules and/or a combination thereof. For example, a "category database" refers to a structured repository that stores and organizes data into predefined categories or classifications based on specific criteria. In the context of network security or communication systems. For example, it may contain information about various entities, such as servers, websites, or content, along with their associated categories, such as security risk levels, content types, or policy compliance. A category database may be used by systems, such as proxies or security servers, to make decisions about how to manage or process data based on these classifications.

In various implementations, the category database in this system is configured solely as a repository for category information and does not support operations or processing tasks beyond basic category lookup. Its role is limited to storing and providing category data in response to lookup requests, as it lacks computational or operational capability to perform additional functions. For example, operational functions, including the use of the category data, are managed by the proxy's policy engine. The policy engine is responsible for implementing system policies and actions based on the data retrieved from the category database.

Interface 250 is electronic circuitry that may communicate virtually or physically by wire or wirelessly, with client 120(*h*) and third-party network 160.

Client 120(*h*) may be any electronic device capable of electronically exchanging information with interface 250 by wire or wirelessly. Client 120(*h*) may be any type of electrically-powered device having computing capability. For example, client 120(*h*) may be a computer terminal, a laptop computer, a tablet computer, and/or any other computing device. In some examples, client 120(*h*) may be telephone, a mobile phone, a smartphone, a cell phone and/or any other electronic telecommunications device. In other examples, client 120(*h*) may be a television set, a video device such as a video display, a video recorder, a digital video recorder (DVR), a set-top box, a set-back box and/or any other electronic entertainment device.

Client 120(*h*) may be a sensor, a power-over-ethernet device, a printer, an appliance (e.g., a washer, dryer, refrigerator, oven and/or other appliance), an Internet of things (IOT) device and/or any other electronic device that is capable of electrically communicating with interface 250.

Client 120(*h*) may be any portable electronic device that can be carried by or worn on a person. For example, client 120(*h*) may be configured as a wearable device, a smartwatch, a fitness tracker, or a personal digital assistant (PDA).

In some examples, client 120(*h*) may be found in apparatuses such as autonomous vehicles, robots, and drones. Client 120(*h*) may be configured as a driver assistance module in a vehicle, a computing device for a vehicle and/or entertainment device for a vehicle. A client 120(*h*) may include a network interface 250 card, a router, a server, a hub, a network switch, a modem, a bridge, an access point, a gateway, and/or mesh network interface 250.

DNS resolver 130 may be any apparatus capable of responding to requests for various standardized resource records, inter alia A/AAAA resource records that translate hostnames into Internet Protocol (IP) addresses and SVCB/HTTPS resource records that provide information needed to make network connections to various network services associated with a particular hostname. For example, "hostname" may be broadly defined as a unique label or identifier assigned to a device or server within a network. DNS resolver 130 may be one or a combination of a physical server, virtual server, or container. A physical server may be hardware that is sited in a building at a geographic location. A virtual server or container may be in the form of software that is running on a physical server in the communications network 140.

Communications network 140 may include any infrastructure that facilitates a bidirectional exchange of information between proxy 110, client 120(*h*), DNS resolver 130, communications network 140, security server 150, and third-party network 160. Communications network 140 may include a public and/or private data network. By way of illustration, communications network 140 may comprise or be part of a data bus, a local area network (LAN), a wide area network (WAN), a public switched telephone network, a cellular network, a core network, a satellite network, the Internet, and/or any other wired or wireless telecommunications communications network.

Security server 150 may include a combination of electronic equipment such as routers, switches, and other hardware equipment. In various implementations, security server (150) generates, maintains, and provides category data to the proxy system. For example, the category database, sourced from the Security server, is utilized by the proxy's policy engine to perform lookups and determine appropriate actions based on the categorization of hostnames or other relevant data. Referred to herein, a "security server" is a system or device responsible for managing, monitoring, and enforcing security policies within a network. For example, a security server analyzes network traffic, identifies potential threats or vulnerabilities, and provides real-time protection by applying security measures, such as access control, encryption, and threat detection. A security server can also store and update intelligence data, communicate with other servers (e.g., proxies, origin servers), and coordinate responses to security incidents, such as blocking malicious traffic or alerting administrators. A security server may operate independently or as part of a broader security infrastructure, safeguarding the network against attacks and unauthorized access.

Security server 150 may be a virtual server, a physical server, or a combination of both. A physical server may be hardware that is sited in a building at a geographic location. A virtual server may be in the form of software that is running on a physical server in the communications network 140. Security server 150 may be situated in a data center. Security server 150 may be sited in a building at a geographic location. Security server 150 may be a combination of electronic equipment that is distributed throughout multiple locations. The multiple locations may include interconnected data centers.

Referring to FIG. 1, third-party network 160 is illustrated. Components of third-party network 160 may comprise client-facing servers 161(1) through 161(X) and origin servers 162(1) through 162(X+K) with "X" being an integer number, "Y" being another integer number and "K" being yet another integer number. Client-facing servers 161(1) through 161(X) may be collectively referred to as "client-facing servers 161(*i*)." Any one of the client-facing servers 161(1) through 161(X) may be individually referred to as "client-facing server 161(*i*)." Origin servers 162(1) through 162(X+K) may be collectively referred to as "origin servers 162(*j*)." Any one of the origin servers 162(1) through 162(X+K) may be individually referred to as "origin server 162(*j*)." For example, a "client-facing server" refers to a server that directly interacts with or manages requests from a client device within a network. In various embodiments, the client-facing server processes incoming communications and requests for data or services. As an example, the client-facing server may relay these requests to other back-end servers or resources and return responses to the client. It can be a physical or virtual server, and its functions may include load balancing, providing content, or managing security, often acting as an intermediary between the client and more complex or distributed server systems. For example, an "origin content server" refers to a primary server where content, data, or services requested by a client are hosted or generated. For example, it may be the source or original location of the requested resources in network communication and responds to client or intermediary server requests by providing the necessary information. The origin server can be a physical or virtual server and may operate independently or as part of a distributed system. Its functions often include storing data, processing transactions, or delivering web content, with the client or intermediary servers relaying the request to and receiving responses from the origin server.

Third-party network 160 may comprise hundreds or thousands of client-facing servers 161 and origin servers 162. Any client-facing server 161(*i*) may be a virtual server, a physical server, or a combination of both. Any origin server 162(*j*) may be a virtual server, a physical server, or a combination of both. A physical server may be hardware in a data center. The physical server may be sited in a building at a geographic location. A virtual server may be in the form of software that is running on a physical server. Via communications network 140, client-facing server 161(*i*) may communicate electronically with client 120(*h*) as will be explained in detail.

Referring to FIG. 3, a flowchart illustrates an example proxy operation performed by processor 210. Computer-readable medium 220 may include machine-readable instructions that are readable and executable by processor 210. Processor 210 may extract, from memory 230 prior to the execution of the proxy operation of FIG. 3, a predetermined time duration. The time duration is the span of time between receipt by interface 250 of intelligence data from security server 150. The time duration may be a fraction of a second, a fraction of a minute, a fraction of an hour. The time duration may be hourly, a day, or longer. As will be explained in detail, the machine-readable instructions of computer-readable medium 220, when executed by processor 210, may cause processor 210 to perform the proxy operation of FIG. 3. For example, "intelligence data" refers to information that has been collected, analyzed, and/or processed to provide insights or actionable knowledge about a specific domain, such as network security, system performance, or user behavior.

Continuously and in real-time, security server 150 may monitor and analyze traffic in system 100 to update the intelligence data. Processor 210 may perform the proxy operation of FIG. 3 concurrently with security server 150 updating the intelligence data. For example, security server 150 may perform out-of-band processing that scans resource records in DNS resolver 130 for server entries in the resource records. The server entries may include the hostnames for client-facing servers 161(1) through 161(X) and the hostnames for origin servers 162(1) through 162(X+K). Referred to herein, "ECH client-facing servers" is the class of client-facing servers 161(1) through 161(X) that support the Encrypted Client Hello (ECH) extension to Transport Layer Security (TLS) Protocol Version 1.3 ("the TLS protocol"). Referred to herein, "ECH origin servers" may be the class of origin servers 162(1) through 162(X+K) that support the ECH extension to the TLS protocol. Transport Layer Security Protocol Version 1.3 is incorporated herein by reference.

In the event that the hostname for client-facing server 161(*i*) is nonexistent in the intelligence data, security server 150 may update the intelligence data with new information related to the client-facing server 161(*i*). Intelligence data may include information that categorizes any client-facing server 161(*i*). For example, security server 150 may update the intelligence data with information derived from the resource records of DNS resolver 130 related to the client-facing server 161(*i*). A website category is a website grouping based on a characteristic such as the type of content hosted on the origin server 162(*j*), the purpose of a website on the origin server 162(*j*) in which the content is hosted, the functionality of the website, and/or the risks associated with accessing the website.

Security server 150 may update the intelligence data with additional information such as hostname for origin server 162(*j*) in the event that this information for origin server 162(*j*) is nonexistent in the intelligence data or requires updating. For example, security server 150 may update the intelligence data including website category based on information in the resource records of DNS resolver 130 for origin server 162(*j*) that is absent from the intelligence data.

In block 300, processor 210 may cause interface 250 to upload a query to security server 150. As illustrated in FIG. 2, interface 250 may electronically connect proxy 110 to security server 150. The query may request security server

150 to download intelligence data to interface 250. The intelligence data may include information related to client-facing servers 161(1) through 161(X), origin servers 162(1) through 162(X+K) any other server operating in third-party network 160. During block 300, processor 210 may commence measuring the time duration. Processor 210 may advance the processing in FIG. 3 from block 300 to block 305 in response to interface 250 receiving the intelligence data.

In block 305, processor 210 may detect whether or not interface 250 has received a client message from client 120(*h*). The client message may be a client hello, as will be explained in detail. Formatting of the client hello may be defined in accordance with the TLS protocol. Illustrated in FIG. 4 is exemplary protocol flow. Those skilled in the art will appreciate that the protocol flow may be a process flow in accordance with the TLS protocol.

Host origin server 162(*j*) is one of the origin servers 162(*j*) to which client 120(*h*) may attempt to retrieve content. A client-facing server 161(*i*) associated with host origin server 162(*j*) is referred to as "host client-facing server 161(*i*)." Host client-facing server 161(*i*) may happen to be an intermediary server between proxy 110 and host origin server 162(*j*) in some instances. Protocol flow is the process by which a client 120(*h*) and host origin server 162(*j*) may establish a secure connection before exchanging encrypted data.

The client message may exist as initial client hello 411 in some situations. Initial client hello 411 is referred to as a "initial TLS client message." In the initial TLS client message, a hostname for a client-facing server (i) may be in unencrypted form and a hostname for an origin server (j) may be in encrypted form. As an example, the unencrypted form may be plaintext. For example, "unencrypted form" refers to data that is transmitted or stored without encryption. In this state, the data is readable or accessible without requiring a cryptographic key. For example, "plaintext" may refer to original or human-readable form of data before any encryption or encoding is applied.

Initial client hello 411 may happen to be destined for host client-facing server 161(*i*). To receive initial client hello 411, interface 250 may intercept initial client hello 411 from client 120(*h*). For example, an "initial TLS client message" refers to a communication transmitted by a client device during the initial phase of a Transport Layer Security (TLS) protocol handshake. This message may contain information such as the client's supported cryptographic algorithms, session parameters, and server identity data, including an unencrypted hostname of the client-facing server and, in some cases, an encrypted hostname of the origin server. The message initiates the process of establishing a secure communication channel between the client and the server, and may vary in content and structure depending on the specific version of the TLS protocol and the client's configuration. For example, to "intercept" refers to the act of capturing, retrieving, or accessing data, signals, or communication in transit between two or more entities. For example, the proxy may modify some of the communication to intercept the TLS protocol. In the context of network systems, intercepting typically involves a device or intermediary system, such as a proxy or firewall, examining or processing the data before it reaches its intended destination. The interception can be done for various purposes, including security analysis, monitoring, filtering, or modifying the communication for optimization or protection.

In other situations, the client message may exist as fallback client hello 431. An initial TLS client message on the fallback connection may occur in cases where a protocol flow through client-facing server 161(*i*) could not be established between client 120(*h*) and host client-facing server 161(*i*). Fallback client hello 431 is referred to as a "initial TLS client message on the fallback connection." In the initial TLS client message on the fallback connection, a hostname for an origin server (j) may be in unencrypted form. To receive fallback client hello 431, interface 250 may intercept fallback client hello 431 from client 120(*h*). For example, a "fallback connection" refers to a secondary or alternative communication pathway initiated by a client or system when the primary connection attempt fails or encounters issues, such as incompatibility, timeout, or unsuccessful negotiation of cryptographic parameters. In response to a client-facing server hostname matching an Encrypted Client Hello (ECH) client-facing server hostname in a list of categories in category database 240, processor 210 may trigger client 120(*h*) to upload an initial TLS client message on a fallback connection to the interface. For example, "trigger" may be broadly defined as an action that initiates or causes a specific response, process, or event within a system, and it may imply that certain conditions or criteria, when met, will automatically or deliberately lead to a predetermined outcome.

The fallback connection may utilize different protocols, configurations, or network routes to reattempt communication with the same or alternative servers, ensuring connectivity and maintaining service availability in the event of failures in the initial connection attempt.

The client message may exist as attacking client hello 471 under some other conditions. Attacking client hello 471 is referred to as an "attacking message." Attacking client hello 471 may happen to be destined for host client-facing server 161(*i*) in cases where interface 250 receives attacking client hello 471.

Processor 210 may advance the processing in FIG. 3 from block 305 to block 315 upon receipt of the client message. Otherwise, processor 210 may advance the processing in FIG. 3 from block 305 to block 310 while awaiting receipt of the client message.

In block 310 of FIG. 3, processor 210 may verify whether or not the time duration has lapsed. A lapse of the time duration may occur when the elapsed amount of time from block 305 to block 310 of FIG. 3 is greater than the time duration. Processor 210 may return the processing in FIG. 3 from block 310 to block 305 in response to verifying that the time duration is not lapsed. Otherwise, processor 210 may advance the processing in FIG. 3 from block 310 to block 300 in response to verifying a lapse of the time duration.

In block 315 of FIG. 3, processor 210 may extract an unencrypted hostname from metadata in the client message. The unencrypted hostname may be in plaintext form. The unencrypted hostname may identify a network entity. The network entity may be an origin server 162(*j*) in some instances. In other instances, a client-facing server 161(*i*) may be the network entity. In alternative instances, the network entity may be malware website 170. Prior to uploading the client message, client 120(*h*) may retrieve the hostname from DNS resolver 130.

In response to extracting the unencrypted hostname, processor 210 may compare the unencrypted hostname with records in category database 240 to ascertain the policy class for the network entity identified in the unencrypted hostname. For example, processor 210 may query a list of categories in category database 240 to identify client-facing server hostname 161(*i*) in category database 240. It should be noted that, as referred to, an ECH client-facing server is a client-facing server 161(*i*) that may decrypt and process encrypted metadata in the client message. As a noun, a "query" may refer to a structured request for information made to a system, database, or service to obtain specific data or results based on defined parameters. As a verb, "to query" may mean to perform the action of requesting information by sending a structured or specific request to a system, database, or service.

The ECH client-facing server may, in accordance with the TLS protocol, process encrypted metadata in the client message. In response to processor 210 ascertaining the policy class for the network entity as an ECH client-facing server, processor 210 may advance the processing in FIG. 3 from block 315 to block 335. Otherwise, processor 210 may advance the processing in FIG. 3 from block 315 to block 320 in response to processor 210 ascertaining the policy class for the network entity as a non-ECH client-facing server.

In block 320, processor 210 may determine the compliance using a policy engine, where it uses category database for lookups. For example, the policy engine determines whether access to the network entity identified in the unencrypted hostname is policy compliant or policy non-compliant. Policy rules are web access control and security policies that are based on content classifications and content risk levels. Policy rules are designed to enhance security by regulating access to websites, web content, and the network entities.

For example, a restricted category in the policy rules is a classification of content hosted on a network entity that may cause a security threat, may include inappropriate content, and/or may be deemed by an access policy as unsuitable, risky, or non-essential for certain users or groups within an organization. By way of example, category database 240 may list the category associated with risky server 162(X+1) as a restricted category. In such instances, processor 210 may identify, in category database 240, the category for content on risky server 162(X+1) as a restricted category. In cases where processor 210 identifies the content on risky server 162(X+1) as a restricted category, processor 210 may determine that access to client-facing server 161(X) is non-compliant with the policy rules.

In other examples, the network entity may be malware website 170. In such instances, processor 210 may compare the domain name for malware website 170 with domain names in category database 240. In response to comparing the domain name for malware website 170 with domain names in category database 240, processor 210 may identify malware website 170 as a security threat and flag any access to malware website 170 as being non-compliant with the policy rules.

Examples described herein resulting in the access to the network entities as being non-compliant with the policy rules are illustrative and is not intended to be exhaustive. Processor 210 may advance the processing in FIG. 3 from block 320 to block 330 in response to verifying that the network entity identified in the unencrypted hostname is policy non-compliant. Otherwise, processor 210 may advance the processing in FIG. 3 from block 320 to block 325 in response to verifying that the network entity identified in the unencrypted hostname is policy compliant.

In block 325, processor 210 may cause proxy 110 to initiate protocol flow with host origin server 162(*j*). On such occasions, processor 210 may incorporate the unencrypted hostname for host origin server 162(*j*) into a forwarded message and cause interface 250 to upload the forwarded message to host origin server 162(*j*). Upon receipt of the forwarded message, host origin server 162(*j*) may download content to client 120(*h*). The content may include, but is not limited to, graphics, media files, software, scripts, documents, live streaming media content, emails, and text messages. Host origin server 162(*j*) may, upon receipt of the forwarded message, provide a variety of services to client 120(*h*). The variety of services may include web browsing, media streaming, text messaging, and online gaming. Processor 210 may advance the processing in FIG. 3 from block 325 to block 310.

In block 330, processor 210 may cause interface 250 to download an advisory to client 120(*h*). The advisory may inform client 120(*h*) of a refusal by proxy 110 to establish a connection with any network entity. The advisory may also inform client 120(*h*) of a reason for the refusal. The reason for the refusal may include an explanation as to why a connection with the network entity is deemed to violate a policy rule. Processor 210 may advance the processing in FIG. 3 from block 330 to block 310.

In block 335, processor 210 may cause proxy 110 to initiate protocol flow with host client-facing server 161(*i*). By way of illustration, processor 210 may extract, from the client message, the unencrypted hostname for host client-facing server 161(*i*) for incorporation into an upstream TLS handshake message. The hostname uniquely identifies the host client-facing server 161(*i*). In response to incorporating the unencrypted hostname into the upstream TLS handshake message, processor 210 may cause interface 250 to forward the upstream TLS handshake message to host client-facing server 161(*i*). Thereafter, processor 210 may advance the processing in FIG. 3 from block 335 to block 340.

In block 340, processor 210 may permit interface 250 to receive an initial server message from host client-facing server 161(*i*). Host client-facing server 161(*i*) may download the initial server message in response to receiving the upstream TLS handshake message from proxy 110. Upon receipt of the initial server message, proxy 110 may forward the initial server message to client 120(*h*) in the form of a downstream server message. Thereafter, processor 210 may advance the processing in FIG. 3 from block 340 to block 310.

Referring to FIG. 4, an event trace diagram may illustrate a protocol flow for the proxy operation of FIG. 3. In cases where client 120(*h*) is absent of malware, client 120(*h*) is referred to as an "uncompromised client." Proxy 110 may receive initial client hello 411 from uncompromised client 120(*h*) in some instances during block 305 of FIG. 3.

In other instances during block 305 of FIG. 3, proxy 110 may receive attacking client hello 471 from compromised client 120(*h*). Client 120(*h*) infected with malware is referred to as a "compromised client."

Metadata in initial client hello 411 and metadata in attacking client hello 471 may each include an unencrypted hostname for ECH client-facing server 161(*i*). However, some differences may exist between initial client hello 411 and attacking client hello 471. For example, whereas metadata in attacking client hello 471 may include an encrypted hostname for malware website 170. In cases where uncompromised client 120(*h*) is attempting to establish a secure connection with origin server 162(*j*), metadata in initial client hello 411 may include an encrypted hostname for origin server 162(*j*).

The upstream TLS handshake message in block 335 of FIG. 3 may happen to be upstream client hello 421 in some instances. Upstream client hello 421 is referred to as an "upstream TLS handshake message." Proxy 110 may incorporate unencrypted hostname for ECH client-facing server 161(i) into upstream client hello 421 and, thereafter, forward upstream client hello 421 to ECH client-facing server 161(i). In other instances, the upstream TLS handshake message in block 335 of FIG. 3 may happen to be upstream client hello 481. Upstream client hello 481 can be also referred to as an "upstream TLS handshake message." Proxy 110 may incorporate unencrypted hostname for ECH client-facing server 161(i) into upstream client hello 481 and, thereafter, forward upstream client hello 481 to ECH client-facing server 161(i).

ECH client-facing server 161(i) may process upstream client hello 421. In some examples, ECH client-facing server 161(i) may process upstream client hello 421 in accordance with the TLS protocol. Processing upstream client hello 421 may allow for ECH client-facing server 161(i) to generate ECH client-facing server hello 422 from metadata in upstream client hello 421 in some instances. ECH client-facing server hello 422 may be referred to as a "downstream TLS handshake message." To receive ECH client-facing server hello 422, interface 250 may intercept ECH client-facing server hello 422 from host client-facing server 161(i). ECH client-facing server hello 422 happens to be destined for client 120(h). Upon receipt from ECH client-facing server 161(i), proxy 110 may forward ECH client-facing server hello 422 to uncompromised client 120(h) in the form of downstream server hello 412, as illustrated in FIG. 4. Downstream server hello 412 may be referred to as a "downstream TLS client message." In such instances, downstream server hello 412 may happen to be the downstream server message of block 340 in FIG. 3. Uncompromised client 120(h) may upload finished message 413 and alert 414 in succession following receipt of downstream server hello 412.

In other instances, ECH client-facing server 161(i) may process upstream client hello 481. In some examples, ECH client-facing server 161(i) may process upstream client hello 481 in accordance with the TLS protocol. Processing upstream client hello 481 may allow for ECH client-facing server 161(i) to generate ECH client-facing server hello 482 from metadata in upstream client hello 481. Upon receipt from ECH client-facing server 161(i), proxy 110 may forward ECH client-facing server hello 482 to compromised client 120(h) in the form of downstream server hello 472, as illustrated in FIG. 4. In such instances, downstream server hello 472 may happen to be the downstream server message of block 340 in FIG. 3.

Metadata in downstream server hello 412 and metadata in downstream server hello 472 may each include one or more cryptographic parameters that are required for the establishment of a secure connection between client 120(h) and ECH client-facing server 161(i). The TLS protocol may define the cryptographic parameters. Negotiation of the cryptographic parameters refers to the process where client 120(h) and ECH client-facing server 161(i) agree on cryptographic algorithms and settings used for a secure connection. Communication failure preventing the establishment of the secure connection may sometimes occur between client 120(h) and ECH client-facing server 161(i) due at least in part to an unsuccessful negotiation of the cryptographic parameters.

The example of FIG. 4 illustrates the absence of a response from compromised client 120(h) upon an occurrence of an unsuccessful negotiation between compromised client 120(h) and ECH client-facing server 161(i) of the cryptographic parameters. On such occasions, compromised client 120(h) may typically cease interacting with ECH client-facing server 161(i) without terminating the connection between compromised client 120(h) and ECH client-facing server 161(i). Instead, either proxy 110 or ECH client-facing server 161(i) may terminate the connection after a period of inactivity between compromised client 120(h) and ECH client-facing server 161(i).

Alternatively, the example of FIG. 4 illustrates an occurrence of an unsuccessful negotiation between uncompromised client 120(h) and ECH client-facing server 161(i) of the cryptographic parameters. On such occasions, uncompromised client 120(h) may upload fallback client hello 431 to establish a secure connection with origin server 162(j). Fallback client hello 431 may happen to be the initial TLS client message on the fallback connection of block 305. Metadata in fallback client hello 431 may include an unencrypted hostname for origin server 162(j). The unencrypted hostname may be in plaintext form. Proxy 110 may incorporate the unencrypted hostname for origin server 162(j) into upstream client hello 441. Thereafter, proxy 110 may forward upstream client hello 441 to origin server 162(j) in a manner described in block 325 of FIG. 3. In such instances, upstream client hello 441 may happen to be the forwarded message of block 325 in FIG. 3.

Upon receipt, origin server 162(j) may process upstream client hello 441. In some examples, origin server 162(j) may process upstream client hello 441 in accordance with the TLS protocol. Processing upstream client hello 441 may allow for origin server 162(j) to generate origin server hello 442 from metadata in upstream client hello 441 in some instances. Origin server 162(j) may forward origin server hello 442 to uncompromised client 120(h), as illustrated in FIG. 4. Metadata in origin server hello 442 may include cryptographic parameters that are required for the establishment of a secure connection between to uncompromised client 120(h) and origin server 162(j). The TLS protocol may define the cryptographic parameters. Following receipt of origin server hello 442, uncompromised client 120(h) may upload finished message 451.

Uncompromised client 120(h) may upload communication request 461 to origin server 162(j) in the example of FIG. 4. Communication request 461 is a message from uncompromised client 120(h) that requests content 462 from origin server 162(j). Content 462 may happen to be the content of block 325 in FIG. 3. Origin server 162(j) may download content 462 to uncompromised client 120(h) in response to processing communication request 461.

Implementation of the proxy operation as illustrated herein is a specific improvement to the functionality of a server by electronically providing security measures essential for automatically mitigating and/or eliminating threats to telecommunications systems and equipment that may arise from server attacks. By analogy, implementation of the proxy operation as illustrated herein is also a specific improvement to the functionality of the telecommunications systems on which the server may operate.

Those skilled in the art will also appreciate the arrangement or interconnection of components such as "coupled," "connected," "on," "under," or similar wording allows for indirect connections, or intervening components or layers.

Certain operations of methods according to the technology, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, may be executed in different orders than are expressly illustrated or described, as appropriate for particular examples of the technology. Further, in some examples, certain operations may be executed in parallel or partially in parallel, including by dedicated parallel processing devices, or separate computing devices configured to interoperate as part of a large system.

As used herein, unless otherwise limited or defined, "or" indicates a non-exclusive list of components or operations that may be present in any variety of combinations, rather than an exclusive list of components that may be present only as alternatives to each other. For example, a list of "A, B, or C" indicates options of: A; B; C; A and B; A and C; B and C; and A, B, and C.

Correspondingly, the term "or" as used herein is intended to indicate exclusive alternatives only when preceded by terms of exclusivity, such as, e.g., "either," "only one of," or "exactly one of." Further, a list preceded by "one or more" (and variations thereon) and including "or" to separate listed elements indicates options of one or more of any or all of the listed elements.

For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C.

Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

In general, the term "or" as used herein only indicates exclusive alternatives (e.g., "one or the other but not both") when preceded by terms of exclusivity, such as, e.g., "either," "only one of," or "exactly one of."

Any mark, if referenced herein, may be common law or registered trademarks of third parties affiliated or unaffiliated with the applicant or the assignee. Use of these marks is by way of example and shall not be construed as descriptive or to limit the scope of disclosed or claimed embodiments to material associated only with such marks.

The articles "a," "an," and "the" are intended to include the plural forms as well, unless the context clearly indicates otherwise.

The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the application, ordinal numbers (e.g., first, second, third, etc.) may be used as an adjective for an element (i.e., any noun in the application).

Although terms such as "first," "second," and "third" may be used herein to describe various members, components, regions, layers, or sections, these members, components, regions, layers, or sections are not to be limited by these terms.

Rather, these terms are only used to distinguish one member, component, region, layer, or section from another member, component, region, layer, or section.

The use of ordinal numbers is not to imply or create any particular ordering of the elements nor to limit any element to being only a single element unless expressly disclosed, such as by the use of the terms "before," "after," "single," and other such terminology.

Rather, the use of ordinal numbers is to distinguish between the elements.

By way of an example, a first element is distinct from a second element, and the first element may encompass more than one element and succeed (or precede) the second element in an ordering of elements.

Thus, a first member, component, region, layer, or section referred to in examples described herein may also be referred to as a second member, component, region, layer, or section without departing from the teachings of the examples.

What is claimed is:

1. A proxy comprising:

an interface configured to:

intercept, from a client, an initial Transport Layer Security (TLS) client message comprised of metadata that includes an unencrypted hostname and encrypted hostname, where the unencrypted hostname refers to an Encrypted Client Hello (ECH) client-facing server hostname and the encrypted hostname refers to an origin content server hostname; and a processor configured to:

categorize the unencrypted hostname as the ECH client-facing server by matching a specific category in a category database or by matching a hostname in a simple list of ECH client-facing servers, and trigger, in response to the unencrypted hostname being categorized as the ECH client-facing server host name and a communication failure preventing an establishment of a secure connection between the client and the ECH client-facing server due at least in part to an unsuccessful negotiation of cryptographic parameters, the client to upload an initial TLS client message on a fallback connection to the interface to establish a secure connection with the origin content server, wherein the fallback connection transmits an origin server hostname in unencrypted form.

2. The proxy according to claim 1, wherein the processor is configured to extract, in response to the interface intercepting the initial TLS client message, the unencrypted hostname from metadata in the initial TLS client message, where the unencrypted hostname refers to the ECH client-facing server hostname.

3. The proxy according to claim 2, wherein the processor is configured to cause, in response to the hostname in the initial TLS client message being categorized as an ECH client-facing server hostname, the interface to upload an upstream TLS handshake message to the ECH client-facing server identified by the hostname.

4. The proxy according to claim 3, wherein the ECH client-facing server comprises a server that supports an ECH extension to a TLS protocol.

5. The proxy according to claim 3, wherein the processor is configured to cause, in response to the interface receiving a downstream TLS handshake message from the ECH client-facing server, the interface to download the downstream TLS handshake message to the client.

6. The proxy according to claim 5, wherein metadata in the downstream TLS handshake message comprises one or more cryptographic parameters that acts as notification to the client of an unsuccessful attempt to use ECH.

7. The proxy according to claim 6, wherein the processor is configured to cause the client to upload the initial TLS client message, with the origin server hostname in unencrypted form, on the fallback connection.

8. The proxy according to claim 1, wherein the processor is configured to extract, in response to the interface intercepting the initial TLS client message on the fallback connection, the unencrypted hostname from metadata in the initial TLS client message, where the unencrypted hostname refers to the origin content server hostname.

9. The proxy according to claim 8, wherein the processor is configured to cause, in response to the hostname in the initial TLS client message not being categorized as an ECH client-facing server hostname, the interface to upload an upstream TLS handshake message to the origin content server identified by the hostname.

10. The proxy according to claim 9, wherein the processor is configured to use policy rules to ascertain compliance of access to an origin server.

11. The proxy according to claim 10, wherein the processor is configured to cause, in response to determining access to the origin server as policy compliant, the interface to allow communications between the client and the origin server.

12. The proxy according to claim 10, wherein the processor is configured to cause, in response to determining access to the origin server as policy non-compliant, the interface to download an advisory to the client without allowing communications between the client and the origin server.

13. The proxy according to claim 12, wherein the processor is configured to cause the interface to upload, to a security server, a query that requests the security server to download the category database.

14. A non-transitory computer-readable medium configured to retain machine-readable instructions that, when executed by a processor, cause the processor to:

cause an interface configured to intercept, from a client, an initial Transport Layer Security (TLS) client message having an Encrypted Client Hello (ECH) client-facing server hostname in unencrypted form and an origin server hostname in encrypted form; and categorize a hostname as the ECH client-facing server by matching a specific category in a category database or by matching the hostname in a simple list of ECH client-facing servers, and trigger, in response to an ECH client-facing server hostname being categorized as the ECH client-facing server host name and a communication failure preventing an establishment of a secure connection between the client and the ECH client-facing server due at least in part to an unsuccessful negotiation of cryptographic parameters, the client to upload an initial TLS client message on a fallback connection to the interface to establish a secure connection with the origin content server, wherein the fallback connection transmits the origin server hostname in unencrypted form.

15. A system comprising:

a security server configured to:

generate, in response to analyzing traffic on the Internet, a category database that categorizes the traffic on the Internet; and a proxy configured to:

cause an interface to access, in response to uploading a request for the category database, the category database from the security server, cause the interface to intercept, from a client, an initial TLS client message having an ECH client-facing server hostname in unencrypted form, categorize a hostname as an ECH client-facing server by matching a specific category in the category database or by matching the hostname in a simple list of ECH client-facing servers, and trigger, in response to the ECH client-facing server hostname being categorized as the ECH client-facing server host name and a communication failure preventing an establishment of a secure connection between the client and the ECH client-facing server due at least in part to an unsuccessful negotiation of cryptographic parameters, the client to upload the initial TLS client message on a fallback connection to the interface to establish a secure connection with the origin content server, wherein the fallback connection transmits an origin server hostname in unencrypted form.

* * * * *